United States Patent [19]

Grube

[11] 4,146,962
[45] Apr. 3, 1979

[54] CHAIN SAW MILL

[76] Inventor: George Grube, 14135 Olde Hwy. 80, El Cajon, Calif. 92021

[21] Appl. No.: 890,317

[22] Filed: Mar. 27, 1978

[51] Int. Cl.² ............................................. B27B 17/02
[52] U.S. Cl. ........................................ 30/371; 30/381; 83/745; 83/794; 83/574; 83/614
[58] Field of Search .................. 83/745, 794, 574, 614, 83/821, 483, 486; 30/371, 381

[56] References Cited

U.S. PATENT DOCUMENTS

| | | | |
|---|---|---|---|
| 3,051,203 | 8/1962 | Hayden | 83/794 |
| 3,092,156 | 6/1963 | Hayden | 30/371 |
| 3,864,830 | 2/1975 | Haddon | 30/371 |
| 3,965,788 | 6/1976 | Granberg | 83/745 |

*Primary Examiner*—Donald R. Schran

*Attorney, Agent, or Firm*—Harris Zimmerman

[57] ABSTRACT

A mill for guiding the cutting of a chain saw includes a pair of rail members, each rail member comprising a length of C-channel, with a lip joined to the distal edge of one leg of the channel and extending parallel to the web of the channel. At least one hole is disposed in the web of each channel length, and a long bolt extends through the hole to join the rail members in parallel disposition. A plurality of rectangular spacer members of various thicknesses are each provided with a hole therethrough to receive the bolt. The bolt extends through a hole in the chain saw bar near the power head to assemble the rail members and spacer members to the chain saw. The lip of one rail member acts as a rip fence riding on a previously cut edge, with the spacers employed to join the chain saw bar to the rip fence at a selected spacing interval therefrom.

9 Claims, 8 Drawing Figures

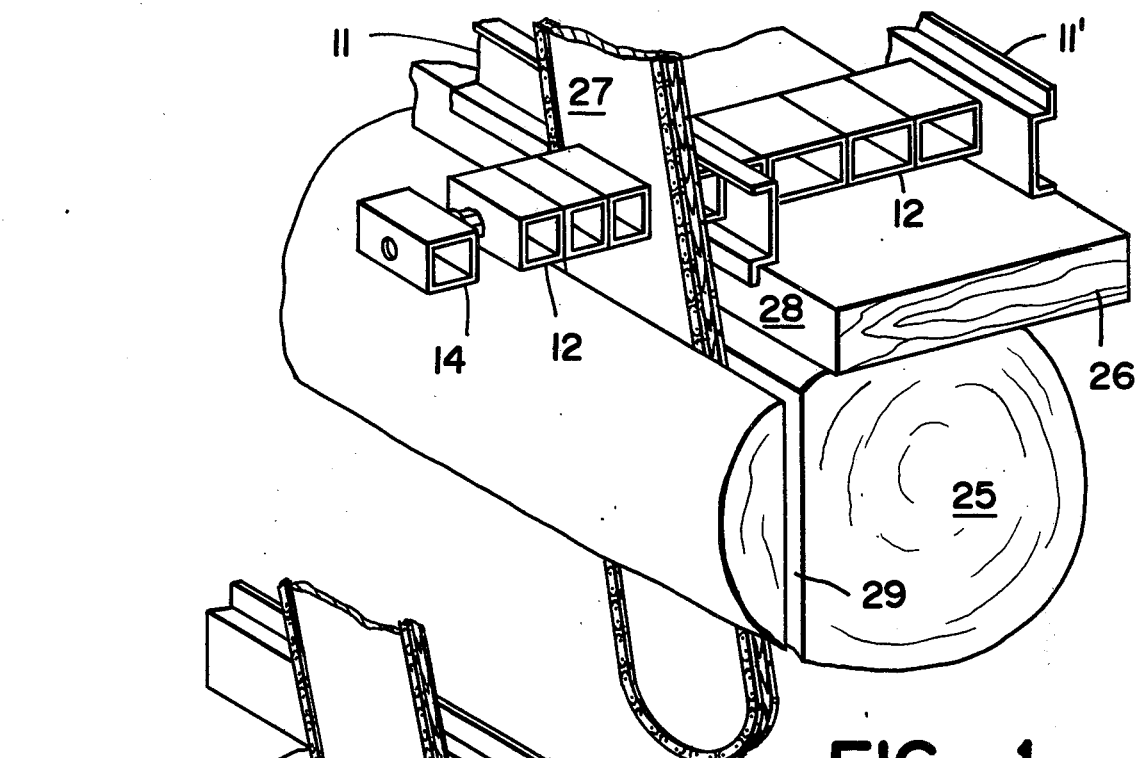
FIG_1
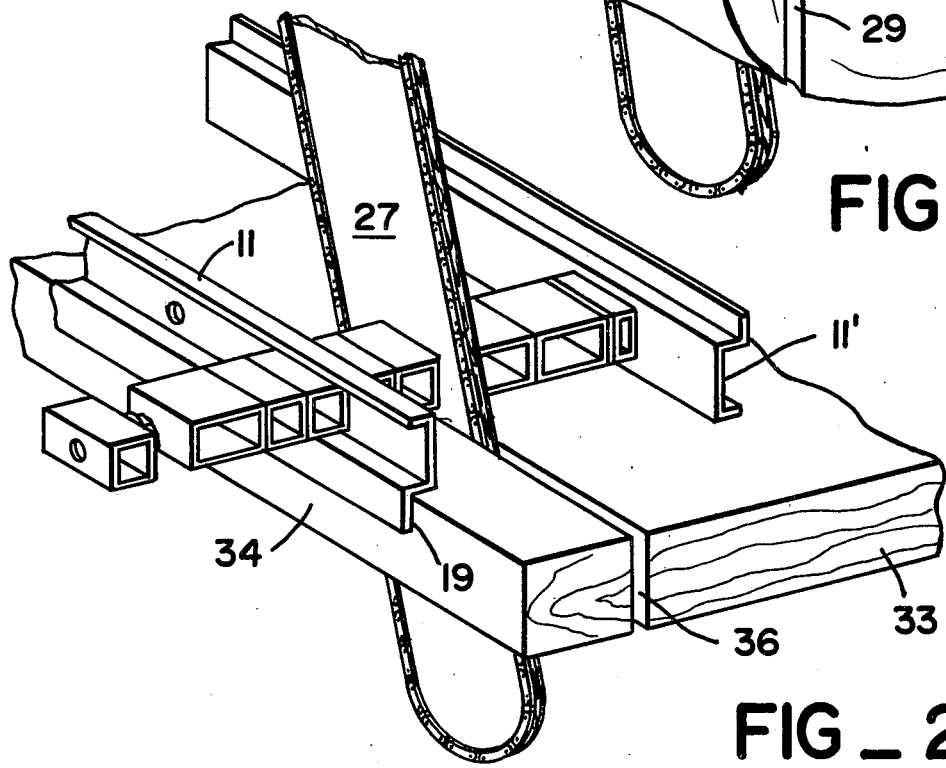
FIG_2
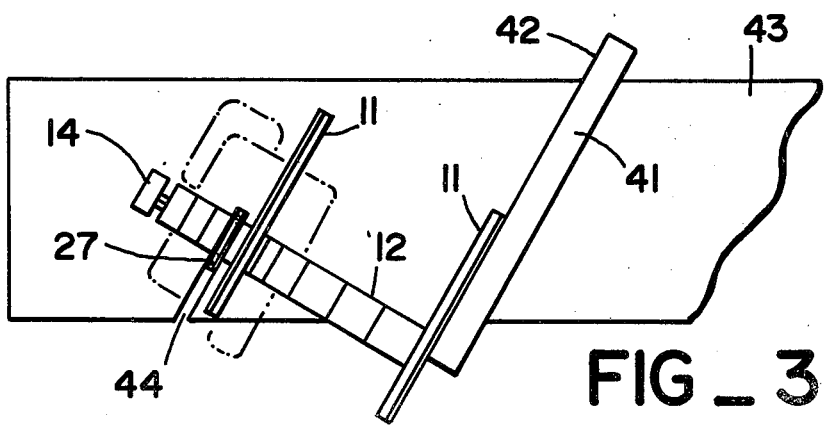
FIG_3

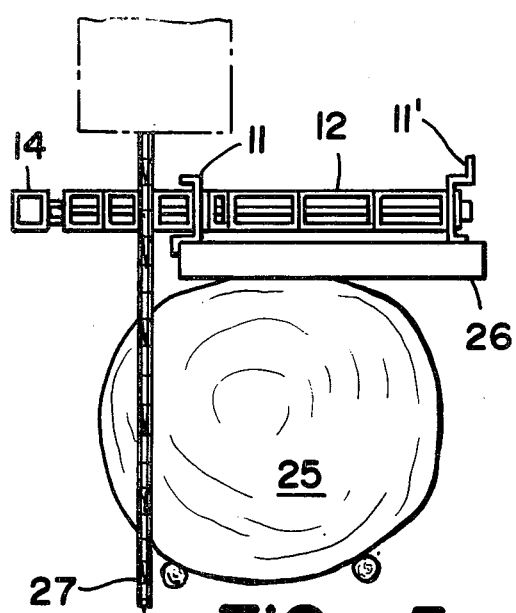
FIG_5
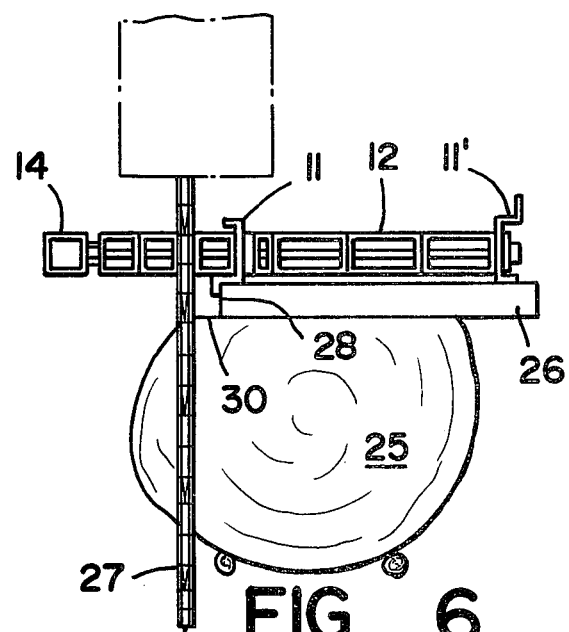
FIG_6
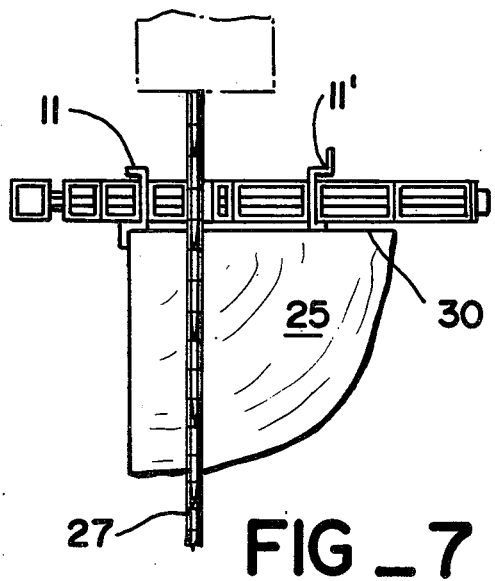
FIG_7
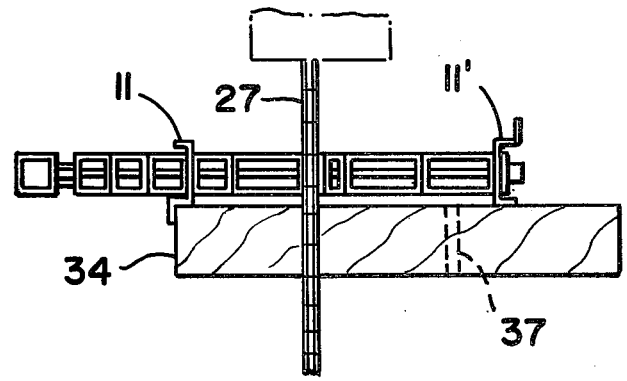
FIG_8
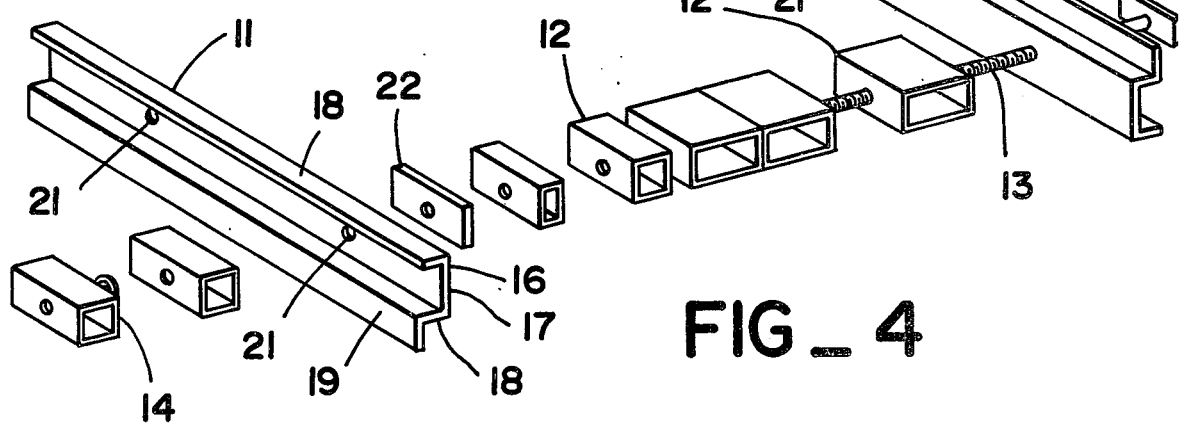
FIG_4

CHAIN SAW MILL

BACKGROUND OF THE INVENTION

The following United States patents comprise the prior art most pertinent to the present invention: U.S. Pat. Nos. 3,965,788, 3,134,409, 3,092,156, 3,051,203.

An increasingly important use for chain saws is the cutting of logs and rough slabs of wood into useful lumber size pieces. Since it is virtually impossible to make straight, planar cuts with a manually supported chain saw, chain saw mills and lumber making attachments have been devised in the prior art for supporting a chain saw during cutting operations to produce smooth cuts and linear pieces.

Chain saw mills and lumber making attachments must securely support the chain saw during a cutting procedure, and also must guide the chain saw bar along a plane so that the cut surface is as planar as possible. Chain saw mills for fashioning lumber out of rough wood often support the chain saw bar in a substantially vertical disposition, and are either bolted or clamped to the chain saw bar. Generally speaking, the prior art devices are guided by a track, tube, or rail which is secured to the wood being cut. These devices achieve planar cuts by traversing the track or rail while supporting the chain saw bar during a cutting procedure.

A significant defect in these prior art chain saw mills is that the guiding track or tube must be reset on the wood being cut prior to each successive cutting procedure. This is a laborious and time consuming task, which must be meticulously carried out in order that the guiding track be aligned parallel to the previously cut surface. Furthermore, any irregularities on the guiding member, such as scratches, nicks, corroded spots, or accumulations of saw dust will cause these devices to deviate from the desired planar cut. Furthermore, these devices generally include a great number of rotating and moving parts which require continual maintenance and inspection.

SUMMARY OF THE PRESENT INVENTION

The present invention generally comprises a chain saw mill for supporting the chain saw with the bar in a vertical disposition to make smooth planar cuts. The invention is an improvement over the prior art in that its novel construction involves no moving parts during operation. Furthermore, it is extremely rugged and durable, and versatile in its many uses.

The invention includes a pair of guide members which are assembled to and translate with the chain saw bar during a cutting procedure. Each guide member comprises a short length of C-channel which is provided with a lip joined to the distal edge of one leg of the C-channel and extending parallel to the web of the channel. The lip acts as a rip fence, translating along a previously cut edge of the work in progress, or along the edge of a plank which is secured to the log being cut.

The invention includes a plurality of spacer members of differing thicknesses, each of them provided with a hole extending therethrough. The guide members and the chain saw bar are also provided with holes therethrough, so that a long bolt may be used to assemble the chain saw bar to the guide members at a selected spacing interval therefrom which is determined by the number and thickness of the spacing members disposed between and the particular guide member which is acting as a rip fence.

The chain saw mill of the present invention is assembled to the chain saw bar with the guide members disposed in a generally parallel disposition and separated by a plurality of the spacer members. The chain saw bar may be secured between the guide members, as when a previously cut edge is being used as the guide surface. Alternatively, the chain saw bar may be secured by the bolt and spacer assembly outside of the two guide members, as when a plank is used as the guide surface. In either case, there are no parts of the invention moving during a cutting operation. Furthermore, the invention comprises only approximately ten parts, many of which are interchangeable and easily replaceable. There is no maintenance whatsoever, and no guide track to be reset before each cut. Moreover, the chain saw cuts produced with the aid of the present invention are extremely smooth and planar.

A BRIEF DESCRIPTION OF THE DRAWING

FIG. 1 is a perspective view of the present invention, shown in conjunction with a plank used as a guide surface.

FIG. 2 is a perspective view of the present invention, shown in conjunction with a chain saw bar ripping a plank lengthwise.

FIG. 3 is a plan view of the present invention, shown in conjunction with a chain saw making an angled cut in a plank.

FIG. 4 is an exploded view of the chain saw mill of the present invention.

FIGS. 5-7 are sequential views showing the present invention used in conjunction with a chain saw to cut a log into lumber.

FIG. 8 is an end view of the present invention shown in use with a chain saw making longitudinal cuts in a plank.

DESCRIPTION OF THE PREFERRED EMBODIMENT

The present invention is generally characterized as a chain saw mill which is assembled to the bar of a chain saw to guide the cutting action thereof. As shown in FIG. 4 of the accompanying drawings, the chain saw mill includes a pair of guide members 11, a plurality of spacer members 12 of differing thicknesses, a long bolt 13 which is adapted to assemble the guide members 11 and the spacer members 12 to a chain saw bar, and a threaded fastener 14 which is secured to the bolt 13 to join the assembly securely to the chain saw bar. The thread fastener 14 forms no independent part of the present invention, and is disclosed more fully in U.S. patent application Ser. No. 854,270, filed Nov. 23, 1977 by George Grube.

Each of the guide members 11 includes a C-channel 16 which comprises a central web 17 having a pair of legs 18 extending orthogonally from the web 17. Joined to the distal edge of one of the legs 18 is a lip 19 which extends outwardly from the distal edge parallel to the central web 17. Each of the guide members 11 also includes at least a pair of holes 21 longitudinally spaced and laterally centered in the central web 17. The holes 21 are sufficient in diameter to receive the bolt 13 freely therethrough.

In the preferred embodiment, most of the spacer members 12 comprise segments of rectangular metal tubing of differing thicknesses. The smallest of the spacer members, 22, is a rectangle cut or sheared from metal plate stock. All of the spacer members are provided with aligned holes in opposing sides thereof through which the bolt 13 may pass freely.

The bolt 13 extends through both of the guide members 11 and through all of the spacer members 12, with the assembly being maintained securely and compressively by the fastener 14 secured on the distal end of the bolt. The spacer members 12 may be assembled in any order, both between the guide members 11 and outside of the guide members. Likewise, the chain saw bar may be interposed at any point in the assembly of spacer members and guide members, either between the guide members or outside the guide members.

Generally speaking, the lip of one of the guide members is used to engage the vertex of a previously cut surface. The other guide member is generally secured at the head end of the bolt 13, and separated from the first guide member by a plurality of spacer members. The guide member near the head of the bolt serves to maintain the bolt in a horizontal disposition. Due to the rectangular nature of the spacer members, the chain saw bar secured to the assembly of the present invention is maintained in a plane exactly perpendicular to the bolt 13.

With reference to FIGS. 1 and 5, the present invention may be advantageously employed to cut a log 25 into useful pieces of lumber. For this use the bar 27 of a chain saw is assembled to the present invention as shown in FIGS. 1 and 5, with the bar being disposed slightly outside of the guide member 11 and spaced therefrom by one of the spacer members. A plank 26, known to have planar and orthogonal sides is secured to the log 25 in a generally horizontal disposition by long nails or spikes. The guide member 11 is disposed so that the lip 19 thereof engages the side 28 of the plank 26. The other guide member, designated 11' is inverted so that one of the legs 18 thereof rests on the top surface of the plank 26 to maintain the bolt 13 substantially parallel to the top surface of the plank. Since the chain saw bar 27 is disposed perpendicular to the bolt, it is also perpendicular to the top surface of the plank.

Beginning at one end of the log 25, the guide member 11 is translated along the edge of the plank with the chain saw operating, so that an initial cut 29 is started and completed. This procedure results in a planar cut surface 30 extending longitudinally on the log 25.

Next, the log 25 is rotated approximately 90 degrees so that the cut surface 30 is disposed generally horizontally. The plank 26 is removed from its initial position and is resecured to the log directly superjacent to and supported by the cut surface 30. With the chain saw and chain saw mill in the same initial assembly configuration, another cut is made in the log using the same edge 28 and the plank 26 as a guide, as shown in FIG. 6. The result of this procedure is a second cut surface extending longitudinally on the log 25 perpendicular to the initial cut surface 30.

The two orthogonal cut surfaces intersect at a common line which extends the length of the log. As shown in FIG. 7, the configuration of the chain saw mill and chain saw bar assembly is then altered so that the chain saw bar is assembled between the guide members 11 and 11', with the spacing between the guide member 11 and the chain saw bar 27 being equal to the desired thickness of the slabs being cut. Again, one or more of the spacer members 12 determines this spacing interval. The lip 19 of the guide member 11 is translated along the edge formed by the intersecting cut surfaces, with the chain saw operating, to effect further longitudinal cuts, parallel to the second cut in the log 25. This cutting procedure may then be reiterated to fashion a plurality of wooden slabs having parallel faces and one orthogonal side surface. Each new cutting procedure forms a new vertex, defined by the intersecting orthogonal surfaces of the log, to guide the subsequent cutting procedure. In this manner the entire log 25 may be converted to slabs of lumber.

The chain saw mill of the present invention may also be used to cut the slabs formed by the process detailed in the preceeding description, or may also be used to cut planks of any origin. As shown in FIGS. 2 and 8, the chain saw mill and bar are assembled with the bar disposed between the guide members 11 and 11'. The chain saw bar is spaced apart from the guide member 11 by one or more of the spacer members 12 to form a spacing interval equal to the desired width of the lumber to be cut. Whether or not the slab 33 to be cut is a result of the previously described cutting procedure, it will include at least one orthogonal side 34 in addition to its planar top and bottom surfaces. The guide member 11 is disposed so that the lip 19 engages the side 34 and the upper vertex associated therewith. The chain saw mill assembly is translated longitudinally along the slab 33 to effect a cut 36 which is substantially parallel to the side 34. This process may be reiterated to form further pieces of lumber, as shown by the dotted line 37 of FIG. 8. Alternatively, the spacing of the guide member 11 and the chain saw bar 27 may be altered to cut lumber of differing widths.

The chain saw mill of the present invention may also be used to make non-orthogonal, or angled cuts in a plank or slab of wood. As shown in FIG. 3, a piece of wood 41 having a straight edge 42 may be secured at an oblique angle to the broad planar surface of a plank or slab 43. The chain saw mill and chain saw bar are assembled with both of the guide members in the inverted position; that is, with the lip 19 of each extending upwardly. The chain saw bar 27 is disposed outside of the assembled guide members, and is secured thereto by appropriate spacers and the threaded fastener 14. One of the guide members 11 is disposed abutting the straight edge 42 of the wooden member 41. The chain saw mill assembly is translated with the member 11 remaining flush with the edge 42, while the chain saw is operating. The cut 44 which results is parallel to the straight edge 42, and spaced apart therefrom by an interval determined by the number and thickness of the spacing members 12. This use of the present invention is particularly adapted to cutting lumber for construction purposes.

It is significant to note that the present invention is extremely versatile in cutting a log into useful lumber pieces. This versatility is complimented by the extreme simplicity of the invention; there are no moving parts, there are only ten pieces in the preferred embodiment, and there is no required maintenance, lubrication, inspection, or the like. Furthermore, it should be noted that the guide members 11 are interchangeable, so that either of them may serve as the edge following member with the other serving to maintain the assembly parallel to the supporting surface. Also, it should be noted that the simplicity of the present invention allows it to be manufactured and distributed at low cost, and in a conveniently small package.

I claim:

1. Apparatus for guiding the cutting of wood by a chain saw which includes a chain saw bar, comprising a pair of guide members; a plurality of spacer members; bolt means for assembling said guide members, said spacer members, and the chain saw bar; said spacer members being selectively positionable to define a desired spacing interval between the chain saw bar and at least one of said guide members; said at least one of said guide members including means for following a guide surface and maintaining the chain saw bar parallel thereto.

2. The apparatus according to claim 1, wherein said spacer members each include a pair of opposed, parallel surfaces, and a hole extending therethrough between said parallel surfaces for receiving said bolt means.

3. The apparatus of claim 1, wherein at least one of said spacer members differs in size from the remainder of said plurality of spacer members.

4. The apparatus of claim 1, wherein said spacer members, said guide members, and the chain saw bar are assembled on said bolt means with said guide members disposed in parallel spaced relationship, the chain saw bar being variably positionable either between or outside said guide members.

5. The apparatus of claim 1, wherein each of said guide members includes a channel member having a medial web portion and at least one leg extending orthogonally from one edge of said medial web portion, and a lip extending from the distal edge of said at least one leg.

6. The apparatus of claim 5, wherein said lip extends parallel to the plane of said medial web portion.

7. The apparatus of claim 1, wherein said guide members, said spacer members, and the chain saw bar all include holes therethrough for freely receiving said bolt means.

8. The apparatus of claim 1, wherein said spacer members includes a plurality of lengths of rectangular tubing.

9. The apparatus of claim 8, wherein said lengths of rectangular tubing have identical lengths and widths and varying heights.

* * * * *